US010606308B2

United States Patent
Jamele et al.

(10) Patent No.: US 10,606,308 B2
(45) Date of Patent: Mar. 31, 2020

(54) GAME STATION AND METHODS OF USING GAME STATIONS

(71) Applicant: MediaMation, Inc., Torrance, CA (US)

(72) Inventors: Daniel Robert Jamele, Palos Verdes Estates, CA (US); Jordan Wolf Ryle, Los Angeles, CA (US); Christopher Ian Coyne, Redondo Beach, CA (US); Robert Bryce Minden Welborn, Los Angeles, CA (US); Dennis Andrew Murphy, Santa Susana, CA (US)

(73) Assignee: MediaMation, Inc., Torrance, CA (US)

( * ) Notice: Subject to any disclaimer, the term of this patent is extended or adjusted under 35 U.S.C. 154(b) by 35 days.

(21) Appl. No.: 15/620,279

(22) Filed: Jun. 12, 2017

(65) Prior Publication Data
US 2018/0356856 A1  Dec. 13, 2018

(51) Int. Cl.
*A63F 13/00* (2014.01)
*G06F 1/16* (2006.01)
(Continued)

(52) U.S. Cl.
CPC ............ *G06F 1/1601* (2013.01); *A63F 13/27* (2014.09); *A63F 13/90* (2014.09); *A47B 2200/0035* (2013.01)

(58) Field of Classification Search
CPC .......... A63F 13/12; A63F 13/00; A63F 13/25; A63F 13/08; A63F 13/90; A63F 13/02;
(Continued)

(56) References Cited

U.S. PATENT DOCUMENTS

| 5,027,474 A | 7/1991 | Bowers |
| D333,493 S | 2/1993 | Sato |

(Continued)

FOREIGN PATENT DOCUMENTS

| DE | 19748793 C1 | 12/1999 |
| GB | 2329829 B | 10/1997 |

OTHER PUBLICATIONS

Barr, 13 Best Gaming Desks of 2017, High Ground Gaming (2017).
(Continued)

*Primary Examiner* — Brian E Glessner
*Assistant Examiner* — Daniel J Kenny
(74) *Attorney, Agent, or Firm* — Camuti Law Group APC; Nathan Camuti (57) ABSTRACT

The present invention relates to a computer station made compact in storage mode and expanded in play mode. In a feature, the invention relates to a game station for a computer, including an articulating wall assembly, a base and floor assembly, and a rotating mechanism secured to the articulating wall assembly and the base, wherein the articulating wall assembly is adapted to support a computer with a monitor, wherein the base and floor assembly provides a floor for a gamer in front of the monitor during play mode and a housing for the articulating wall assembly during storage mode, and wherein the rotating mechanism is adapted to rotate the articulating wall assembly with the computer with the monitor from a vertical position in play mode to a horizontal position in storage mode. In a feature, the computer station is used as a game station, especially for multiplayer game stations.

41 Claims, 9 Drawing Sheets

(51) Int. Cl.
*A63F 13/90* (2014.01)
*A63F 13/27* (2014.01)

(58) Field of Classification Search
CPC ............... G07F 17/3216; G06F 1/1601; A47B 2200/0035
USPC .................. 312/240, 241, 223.3, 257.1, 258; 108/33–35, 38, 41, 50.02, 25; 463/46; 273/285
See application file for complete search history.

(56) References Cited

U.S. PATENT DOCUMENTS

| | | | | |
|---|---|---|---|---|
| 5,293,720 A * | 3/1994 | Brice | ................... | A47B 17/003 160/135 |
| 5,556,164 A * | 9/1996 | Cindea | ................... | A47C 9/025 248/425 |
| 5,807,177 A | 9/1998 | Takemoto et al. | | |
| 5,882,070 A * | 3/1999 | Genn | ................... | A47B 97/04 248/461 |
| 6,033,014 A * | 3/2000 | Nightengale | ............ | A47B 3/14 108/42 |
| 6,142,877 A * | 11/2000 | Nishimura | ............... | A63F 13/08 434/62 |
| 6,354,044 B1 * | 3/2002 | Lagace, Jr. | ............... | A47C 7/72 297/184.14 |
| 6,827,409 B2 * | 12/2004 | Michael | ............. | A47B 21/0073 248/920 |
| 6,874,431 B1 * | 4/2005 | Danna | ................... | A47B 21/03 108/102 |
| 7,735,941 B2 * | 6/2010 | Heathcote | ............... | A63F 13/02 312/241 |
| 8,800,455 B2 * | 8/2014 | Monroe | .................. | B62B 3/004 108/15 |
| 9,224,308 B2 * | 12/2015 | Martel | ...................... | G09B 9/12 |
| 2001/0020810 A1 * | 9/2001 | Kennedy | ................ | A47B 21/00 312/223.3 |
| 2010/0201165 A1 | 8/2010 | Dankovich | | |
| 2012/0282997 A1 | 11/2012 | Miner et al. | | |
| 2014/0272809 A1 | 9/2014 | Martel et al. | | |
| 2016/0184716 A1 * | 6/2016 | Sprenger | ................. | A63F 13/90 463/46 |

OTHER PUBLICATIONS

Folding Laptop Table, ChinaPrices.net (2017).
Pickersgill, Coolest DIY Gaming Tables (2016).
Varda, Kenton's Weekend Projects—LAN-Party Optimized House (2011).

* cited by examiner

GAME STATION AND METHODS OF USING GAME STATIONS

BACKGROUND

The present invention relates to computer stations and methods of using computer stations. In particular, each computer station is suitable for use as a game station and is compact in storage mode and expanded in play mode.

As background, a video game may be implemented in hardware/software (e.g., Microsoft Windows and Apple Mac OS desktop and laptops and video game platforms) with conventional devices for user interface (e.g., mouse, joysticks, keyboard, and touch screen) to permit a user to input commands to the computer that generate actions within a game shown on a display (e.g., computer screen or virtual reality head mounted displays) to produce two and three-dimensional images.

Although video games are often played by a single player, multiplayer video games have become popular as they can challenge the player to more than preprogrammed challenges. Multiplayer video games allow players to collaborate, supervise or compete with other players and provide a social interaction with other players that are absent in single player games. Of course, collaborating with others and/or competing with others can make it more fun to play a game. Local area networks can permit players to play the same video game (e.g., fighting, shooter, battles, and strategy games) in the same room. We sometimes refer to competitive multiplayer video games as electronic sports (eSports). If the players' game is played by experienced or professional players and displayed so an audience can see the progress of the game in real time, eSports like other competitive games where the outcome is not always certain can generate excitement not just for players but for the audience.

SUMMARY OF THE INVENTION

The present invention relates to a computer station that can be made compact in storage mode and expanded for operation.

The computer station can be used in a variety of applications, but is particularly suitable for use as a game station especially when the game stations are arranged in an assembly.

In a feature, the invention relates to a game station including an articulating wall assembly, a base and floor assembly, and a rotating mechanism secured to the articulating wall assembly and the base and floor assembly, wherein the articulating wall assembly is adapted to support a computer with a monitor, wherein the base and floor assembly provides a floor for a gamer in front of the monitor during play mode and a housing for the articulating wall assembly during storage mode, and wherein the rotating mechanism is adapted to rotate the articulating wall assembly with the computer with the monitor from a vertical position in play mode down into the base and floor assembly in storage mode.

In a feature, the computer station is useful as a game station, especially for multiplayer games. In a feature, the invention relates to a game station that has a storage mode and a play mode. In a feature, a set of computer stations can be arranged in a row for multiplayer competitive video games.

In another feature, a computer station includes a base and floor assembly with a storage space for an articulating wall assembly that supports a computer, a monitor, and a desk. The base and floor assembly includes a floor for a seat and an opening for the articulating wall assembly to retract when the station is folded up for storage and expand when the station is expanded for operation.

In still another feature, the invention relates to methods of using one or more game stations.

DETAILED DESCRIPTION OF THE PREFERRED EMBODIMENTS

The following description includes the best mode of carrying out the invention. The detailed description is made to illustrate the principles of the invention and should not be taken in a limiting sense. The scope of the invention is determined by reference to the claims. Each part is assigned its own part number throughout the specification and the drawings.

The named inventors recognize that computer stations should have an operation mode (e.g., play mode) and a storage mode to permit higher utility of the rooms where the computer station is used. When use of the computer station is complete it is desirable to reduce the storage space and secure and protect the computer and the monitor from theft and damage. If the computer station is used as game station, it would be desirable if those implementing multiplayer games can quickly assemble a set of game stations, for example, in a movie theatre then compact the game stations for storage when no longer required and even change the function of the game stations to other uses such as a raised continuous floor or stage.

Figure 1:
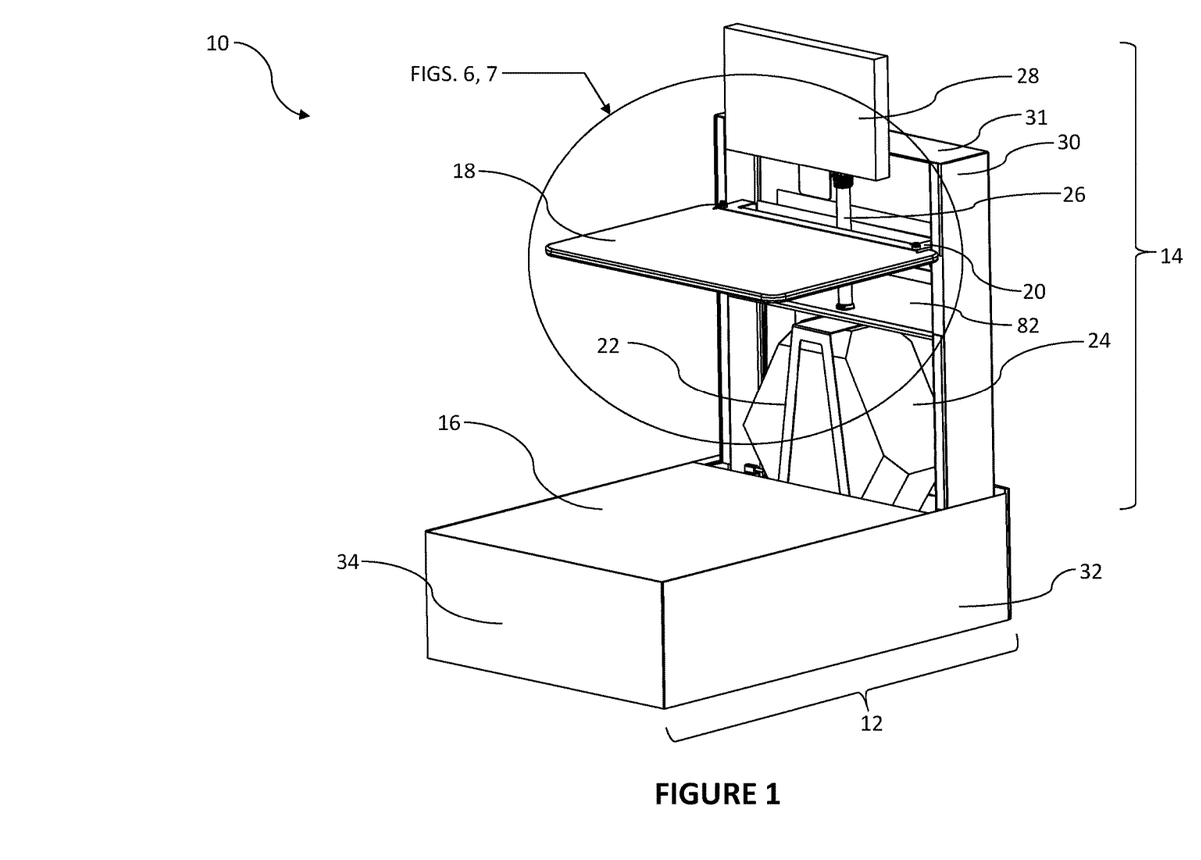
FIG. 1 illustrates an embodiment of a game station in play mode.

FIG. 1 illustrates an embodiment of a game station in play mode. In the embodiment, the game station 10 includes a base and floor assembly 12 that rests on the floor of a building (e.g., a movie theatre) and an articulating wall assembly 14 that extends from the base and floor assembly 12.

Figure 2A:
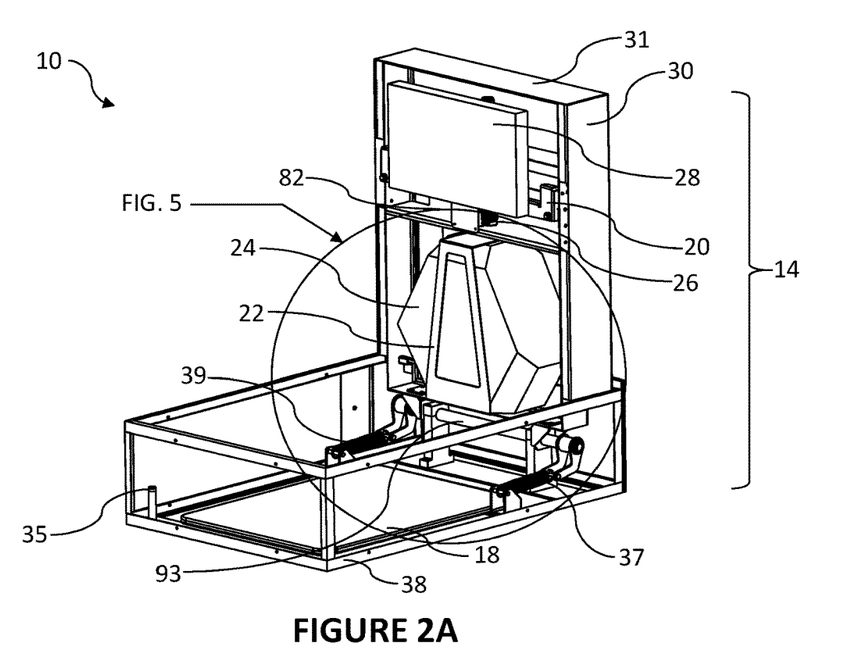
FIG. 2A illustrates an embodiment of a game station ready to transition into storage mode.

The base and floor assembly 12 has a floor 16, a back cover 34, an end cover 32, and a front floor cover 70 (FIG. 4) secured (e.g., clipped, screwed) to a box frame 38 (FIG.

2A). In storage mode described below, the base and floor assembly 12 will be a protective enclosure that hides and secures a computer 24, a computer monitor 28, an audience screen 40 (FIG. 4), input devices (not shown), and a desk 18. A suitable computer is the Alienware Area 51 that can be obtained from Dell Corporation, Round Rock, Tex.

In play mode, the gamer stands or sits on a chair (not shown) that rests, rolls, or slides on the floor 16. As shown in FIG. 1, the articulating wall assembly 14 extends vertically from an opening adjacent to the floor 16. The articulating wall assembly 14 has wall covers 30, 31 that surround and protect a computer 24 held in place by a computer mount bracket 22.

In an embodiment, the articulating wall assembly 14 includes an articulating monitor mount 26 that extends from a monitor mount shelf 82 secured to the inner surface of wall covers 30, 31, and supports a computer monitor 28. A suitable articulating monitor mount is the Visidec VF-M manufactured by Atdec, Macquarie Park, New South Wales, Australia, which can move the computer monitor up and down, pan, tilt, or rotate depending on the gamer's preferences and viewing needs. An articulating desk mount 20 supports the desk 18. The desk 18 supports conventional computer input devices such as a keyboard, mouse, track pad, and/or joy stick to interact with the game.

FIG. 2A illustrates an embodiment of a game station ready to transition into storage mode. The floor 16, the end cover 32, and the back cover 34 shown in FIG. 1 are removed in FIG. 2A to reveal the internal structures of the game station 10.

In an embodiment, a box frame 38 of a rigid material strengthens the base and floor assembly 12. The box frame 38 also provides a solid mounting surface for various components and parts of the game station 10. However, a box frame 38 is not essential to the base and floor assembly 12. In an alternative embodiment, sufficiently rigid covers and the floor secured along their edges (e.g., welding, machine screws/bolts, extension tabs) to each other can replace the need for the box frame 38. However, applicants believe the game station 10 is less expensive to make and more rugged in play mode and storage mode if it includes a box frame 38.

A set of bumpers (e.g., bumper 35) attached to an end of the box frame 38 support the articulating wall assembly 14 in storage mode. In an alternative embodiment, the game station 10 may have only a single bumper such as bumper 35, but it is desirable to have a bumper at each corner to evenly distribute the load of the articulating wall assembly 14.

To transition to storage mode, a person removes the floor 16 (FIG. 1) and the desk 18 from the game station 10. As shown in FIG. 2A, the articulating wall assembly 14 is vertical, but ready to rotate into the base and floor assembly 12 by being coupled to a rotating mechanism. Parts 18, 22, 24, 26, 37, 39, 82, and 93 that are encircled will be described below in connection with FIG. 5. Parts 28, 30, and 31 will be described below in connection with FIGS. 6-7.

Figure 2B:
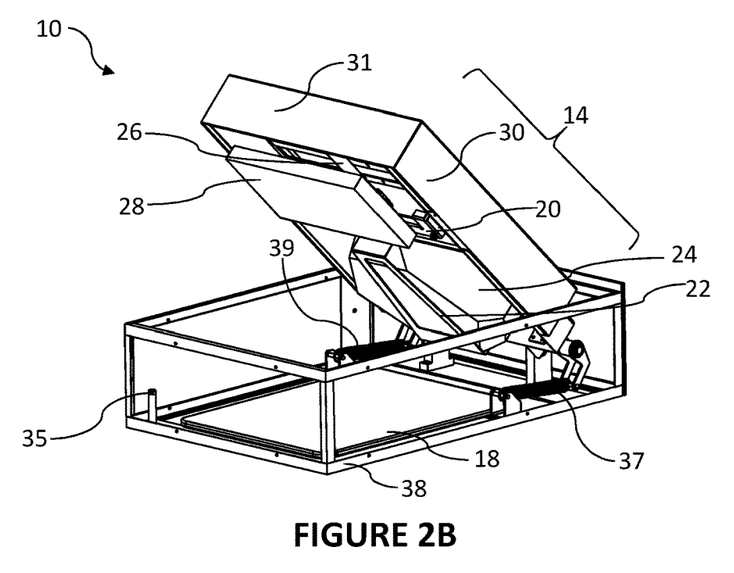
FIG. 2B illustrates an embodiment of a game station half-transitioned into storage mode.

FIG. 2B illustrates an embodiment of a game station half-transitioned into storage mode. The game station 10 includes a rotating mechanism coupled to the articulating wall assembly 14. The articulating wall assembly 14 includes wall covers 30 that surround an articulating desk mount 20, a computer mount bracket 22 holding a computer 24, and an articulating monitor mount 26 holding a computer monitor 28. A suitable computer monitor is the Dell S2716DG, manufactured by Dell Corporation, Round Rock, Tex.

A rotation mechanism partially shown in FIG. 2B and described in detail in connection with FIGS. 5 and 8 allows the articulating wall assembly 14 to rotate into the box frame 38. The rotation mechanism permits the game station 10 to go from play mode shown in FIG. 1 to storage mode shown in FIG. 2D. As shown in FIG. 2B, when in half-transition to storage mode, the articulating wall assembly 14 is rotated about halfway toward the space defined by the box frame 38.

In a preferred embodiment, a set of springs 37, 39 help a worker rotating the articulating wall assembly 14 into the box frame 38 from play mode to storage mode. A suitable spring is the Spring Store PE177-1750-34.073-MW-9.000-CO-N-IN, manufactured by The Spring Store, Colton, Calif. An electrical motor (not shown) can assist or replace the springs, but spring assist requires no electrical power to provide a counterforce to gravity. In an alternative embodiment, the game station 10 requires no springs if the weight of the computer 24, the computer monitor 28 and the articulating wall assembly 14 is sufficiently light to readily manage without it. The desk 18 is not a factor in "assist" because it is removed from the articulating wall assembly 14 prior to rotation and rests inside the box frame 38. As will be shown in FIG. 2C, the bumper 35 will serve as a resting surface for the articulating wall assembly 14 in storage mode.

Figure 2C:
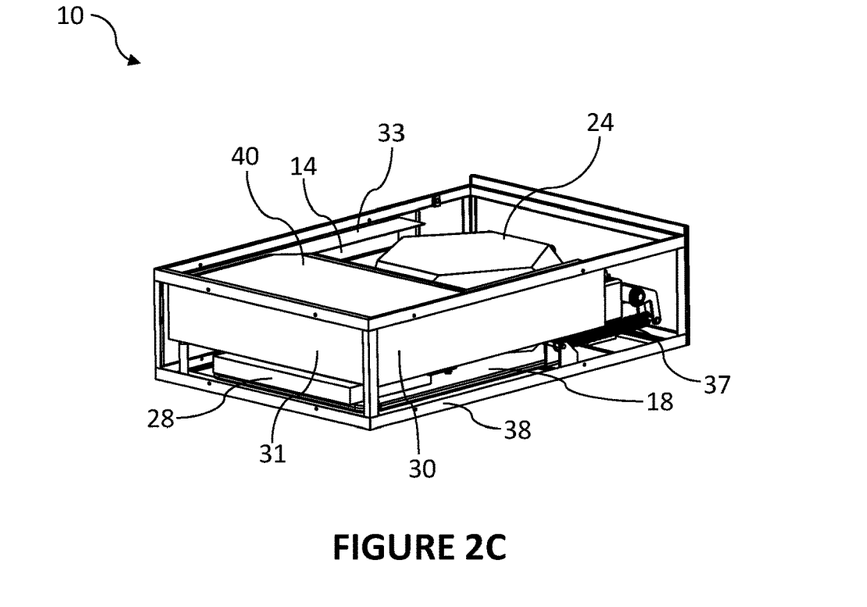
FIG. 2C illustrates an embodiment of a game station in storage mode with the floor and covers removed.
Figure 4:
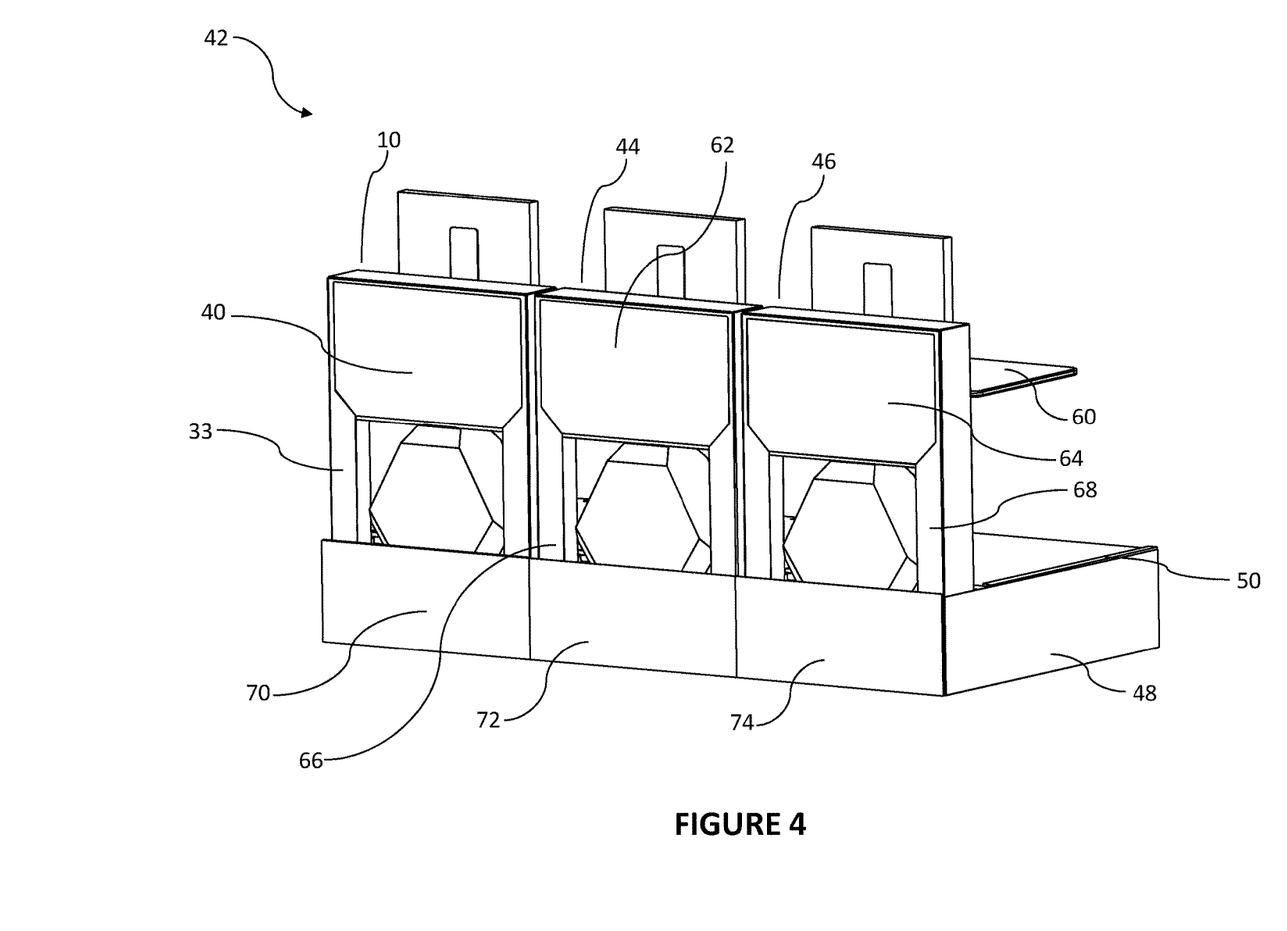
FIG. 4 illustrates an embodiment of an assembly of game stations in a row shown from the audience's view.

FIG. 2C illustrates an embodiment of the game station in storage mode with the floor and the covers removed. As shown, the articulating wall assembly 14 has rotated about the hinge arm 93 (FIG. 5) with the spring 37 inside the box frame 38 of the game station 10. The bumpers (e.g., bumper 35 in FIG. 2B) stop the rotation of the articulating wall assembly 14 and leave adequate space for the computer monitor 28 and the desk 18. The front cover 30 of the articulating wall assembly 14, and the audience screen 40 and the computer 24 secured to the articulating wall assembly 14 are below the edges of the box frame 38. In an embodiment, the audience screen 40 can be used to show what the gamer is seeing on computer monitor 28, or used as a single continuous video wall with the other game stations' audience screens as shown in FIG. 4. Thus, the game station 10 is ready to transition into full storage mode, which will be illustrated in conjunction with FIG. 2D. The front cover 30 is a side piece, front cover 31 is top piece, and front cover 33 is a front piece. Each of the front covers can be a graphic or LED-backlit panel for aesthetic purposes.

Figure 2D:
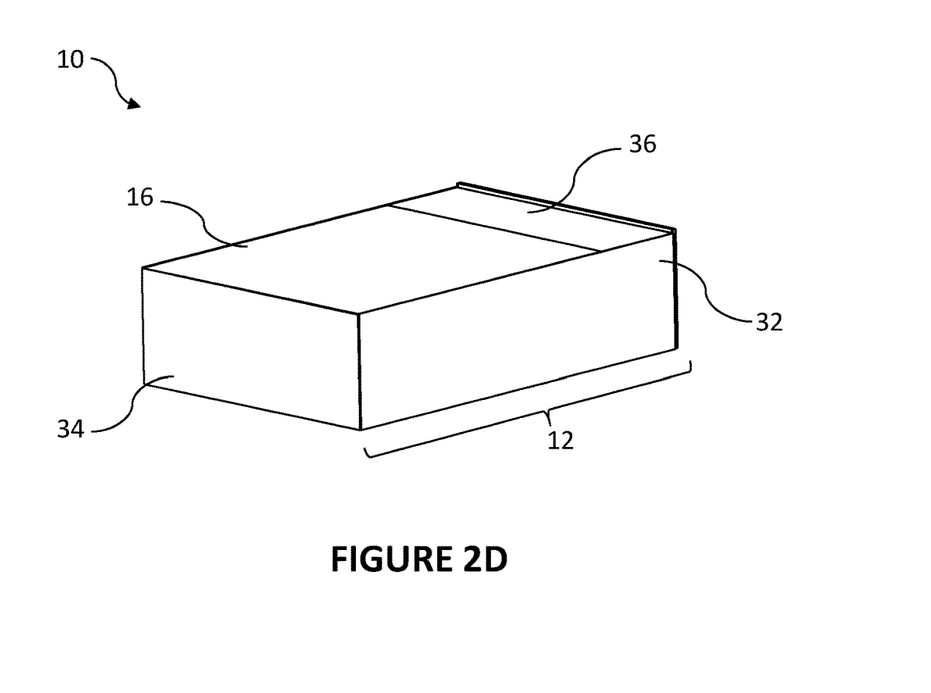
FIG. 2D illustrates an embodiment of the computer station in storage mode with the floor and covers installed.

FIG. 2D illustrates an embodiment of a game station in storage mode. In storage mode, the floor 16, a floor filler piece 36, the back cover 34, and the end cover 32 are attached to the box frame 38 (FIG. 2C). The floor filler piece 36 is only used in storage mode. It fills the gap in the floor 16 left after the wall assembly 14 rotates into the base and floor assembly 12. In storage mode, the base and floor assembly 12 especially as an assembly of game stations can function as small stage. Moreover, the base and floor assembly 12 is rugged and protects the computer 24, the computer monitor 28, the audience screen 40, and the front cover 30 from damage. In addition, to protection from damage, the base and floor assembly covers can be locked up. Finally, because a set of game stations in storage mode appears to be a small stage, its contents are hidden from view, which provides a degree of security. This permits a venue like a movie theatre to host multiplayer gaming events, then quickly store the game stations in a safe secure manner to resume showing movies to customers.

Figure 3:
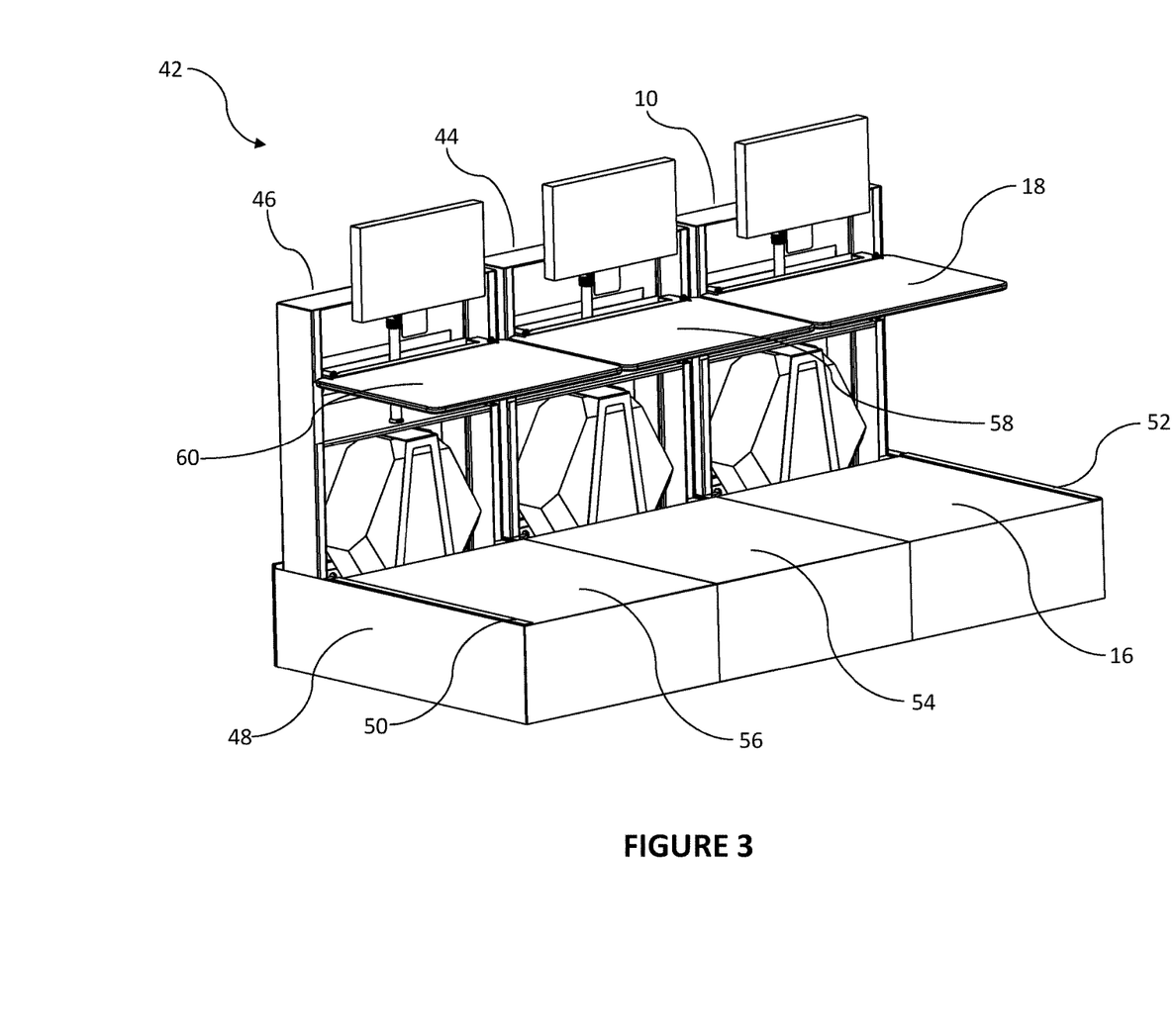
FIG. 3 illustrates an embodiment of an assembly of game stations in a row from the players' view.

FIG. 3 illustrates an embodiment of a multi-game station assembly in a row from the players' view. Any number of game stations can be connected limited only by the size of the forum and reach of the LAN. Each of game stations 10, 44, 46 are as described in the specification and FIGS. 1 and 2A-2D. Thus, multi-game station assembly 42 includes a game station 10 with a desk 18 and a floor 16, a game station 44 with a desk 58 and a floor 54, and a game station 46 with a desk 60 and a floor 56. In an embodiment, the game station 10 includes a chair edge bumper 52 to keep a chair from rolling off the side of the floor 16. Likewise, game station 46 includes a chair edge bumper 50 to keep a chair from rolling of the side of floor 56. Because game stations 10, 44, and 46 are tightly packed together and/or connected in the assembly, in the illustrated embodiment there is no need for chair edge bumpers on the floor edges of game station 44 nor on the inner floor edges of the game stations 10 and 46. In addition, the game stations can be secured to each other. However, if there is any possibility of lateral space between the game stations, chair edge bumpers can be secured to each edge of the floor of each game station.

In another embodiment, it may be preferred to only have an end cover for the game station on the ends of the game station assembly. For example, game station 46 would have an end cover 48, and the game station 44 would not require an end cover since its ends are not exposed given the close adjacent surrounding positions of the game stations 10 and 46.

FIG. 4 illustrates an embodiment of a multi-game station assembly in a row shown from the audience's view. Each of game stations 10, 44, and 46 are made as described in the specification and FIGS. 1, 2A-2D and 5-8.

From the view of the audience, FIG. 4 shows the multi-game station assembly 42 also includes a game station 10 with a front cover 33, an audience screen 40, and a front floor cover 70, a game station 44 with a front cover 66, an audience screen 62, and a front floor cover 72, and a game station 46 with a front cover 68, an audience screen 64, and a front floor cover 74. FIG. 4, like FIG. 3, also shows that game station 46 includes a desk 60, a chair edge bumper 50, and an end cover 48, which have the functions described earlier. In FIG. 3, the desks 18 and 58 and chair edge bumper 52 of the game stations 10 and 44 are hidden from view. Front covers 70, 72, and 74 may have the same functions and physical structures described earlier in connection with front covers 30, 31, and 33.

The front floor covers 70, 72, and 74 have the same protective and security function as the end and back covers (e.g., end cover 32 and back cover 34). The end cover 32 is used on the end of a row of game stations and can be removed if two or more game stations are connected. The back cover 34 can be used if no stage extension is desired. The stage extension (not shown) may be attached to the back of a game station to increase the depth and chair-sliding area. The base and floor assembly 12 are preferably secure in all directions. In addition, because the front floor covers 70, 72, and 74 face the audience, they can be locations for LED, computer, and/or graphic announcements, advertisements and information for the audience. In an embodiment, the game stations are secured to each other.

In another embodiment, it may be preferred in environments where the game stations are left at a given location in a building to only have an end cover for the game station on the ends of the game station assembly. For example, game station 46 would have an end cover 48, and the game station 44 would not require an end cover since its ends are not exposed given the close adjacent surrounding positions of the game stations 10 and 46. In an alternative embodiment, if the game stations are separated it may be preferred to provide end covers on both sides of each game station for security and protection of the computer hardware inside the game station during storage mode.

Figure 5:
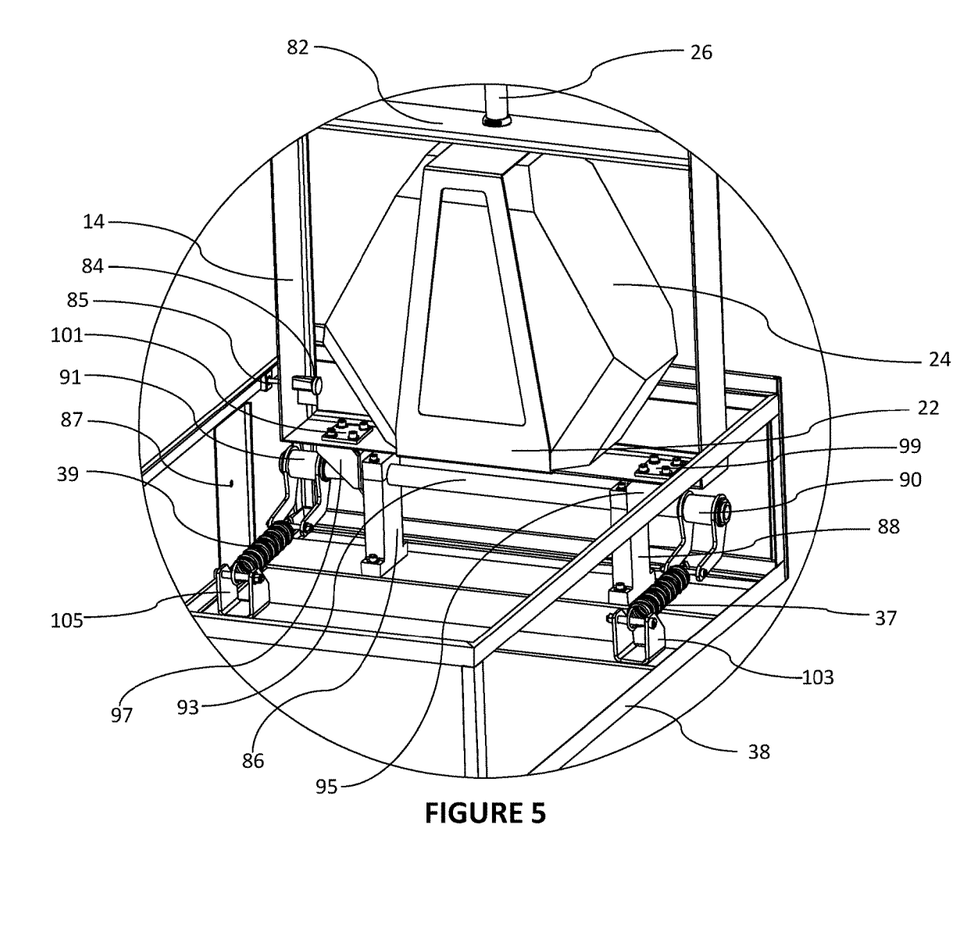
FIG. 5 illustrates an embodiment of the lower part of an articulating wall assembly coupled to a rotating mechanism.

FIG. 5 illustrates an embodiment of the lower portion of an articulating wall assembly coupled to a rotating mechanism that permits play mode and storage mode of the game station. As shown, the game station is in play mode. In the illustrated embodiment, the articulating wall assembly 14 is the shape of a box. In an alternative embodiment, the articulating wall assembly 14 is another shape (e.g., triangle, truncated cone, etc.) as long as the wall assembly 14 is rigid and strong and can securely support a computer 24 and a computer monitor 28 (FIG. 6) in play mode and storage mode and rotation therebetween. In play mode, the bottom wall of the wall assembly 14 supports the computer 24 and the top wall is a monitor mount shelf 82 that supports an articulating monitor mount 26, which in turn secures the computer monitor 28 (FIG. 1). The wall assembly 14 is secured to a computer mount bracket 22 that hooks around the top surface of a computer 24, which secures the computer 24 to the articulating wall assembly 14. In an embodiment, the wall assembly 14 is secured to a rotating mechanism shown as secured to the articulating wall assembly 14 in FIG. 5 and in an exploded view in FIG. 8.

In an embodiment, a set of articulating wall mount plates 99 and 101 are secured (e.g., screwed) through the bottom wall of the articulating wall assembly 14 to a set of articulating wall mount brackets 95 and 97 that are in turn secured (e.g., welded) to a hinge arm 93. The top of rotating arm mounts 86 and 88 rotatably hold and support the hinge arm 93. The bottom of rotating arm mounts 86 and 88 are secured (e.g., screwed) to a first horizontal member spanning the width and secured to the box frame 38. A set of clevis spring mounts 90 and 91 are secured (e.g., welded or screwed) to the ends of the hinge arm 93.

A spring 37 is connected to the clevis spring mount 90 and box frame spring mount 103. A spring 39 is connected to the clevis spring mount 91 and the box frame spring mount 105. Spring 37 and spring 39 provide a counterforce to assist a worker rotating the articulating wall assembly 14, along with the weight of the computer 24, and the computer monitor 28 from play mode to storage mode (See FIGS. 2A, 2B, and 2C). A locking pin 84, a locking pin latch 85, and a locking latch 87 will be used to maintain the articulating wall assembly 14 in either play mode or storage mode.

Figure 6:
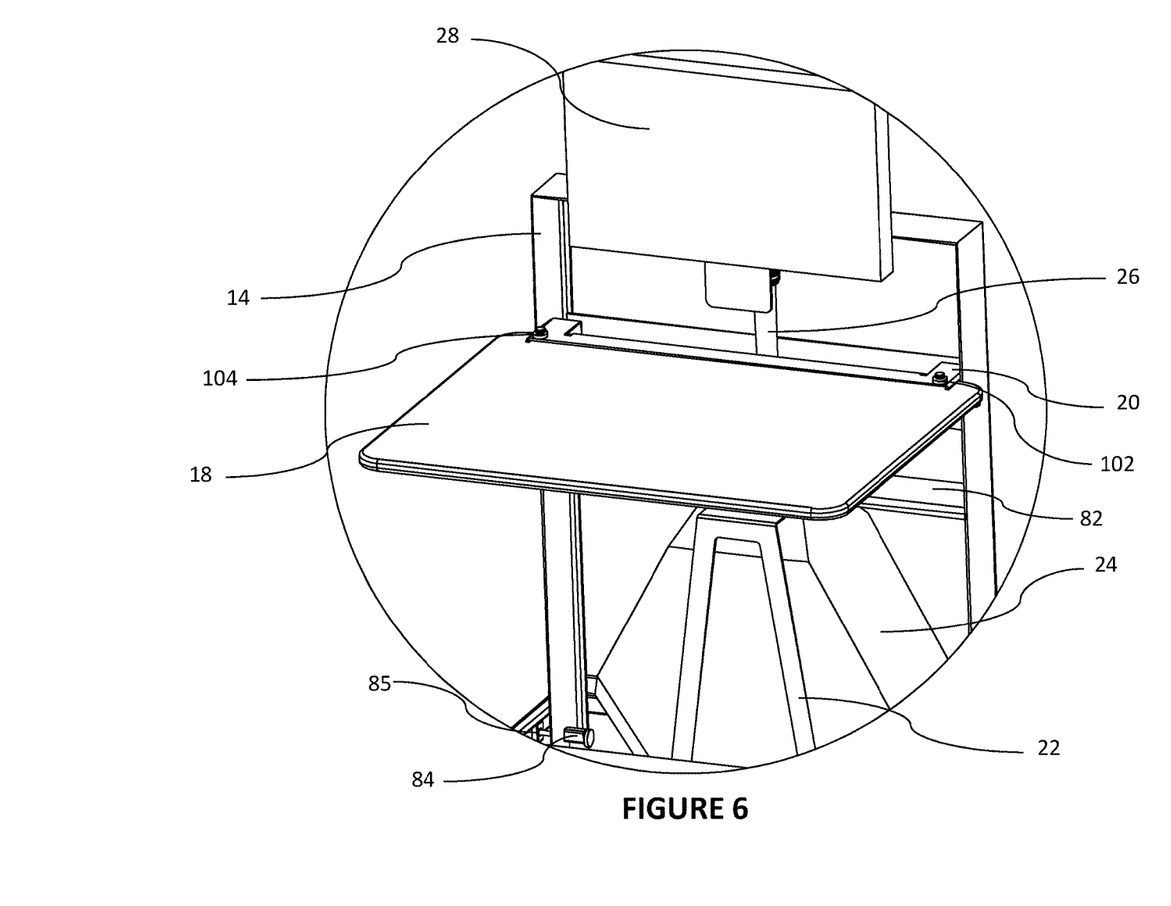
FIG. 6 illustrates an embodiment of the upper part of an articulating wall assembly coupled to a computer, a desk, and a computer monitor.

FIG. 6 illustrates an embodiment of the upper portion of an articulating wall assembly coupled to a computer, a desk, and a computer monitor of the game station in play mode. In play mode, a locking pin 84 locks the articulating wall assembly 14 (shown in the lifted position) in play mode or storage mode by insertion into the locking pin latch 87 of the box frame 38, which secures articulating wall assembly 14 to the box frame 38. FIG. 5 best illustrates the locking pin latch 87 which is what locking pin 84 locks into when the articulating wall assembly 14 is in storage mode.

The articulating wall assembly 14 includes a computer monitor 28 supported by an articulating monitor mount 26 that extends from a monitor mount shelf 82 which is secured to the articulating wall assembly 14. A computer mount bracket 22 secures the computer 24 to the assembly 14. An articulating desk mount 20 supports a desk 18. In an embodiment, the desk 18 is secured at a desired height and the gamer will adjust to the seat by raising or lowering his or her chair. In an alternative embodiment, the articulating desk mount 20 can also slide and be secured to the monitor mount 26 to move the desk 18 vertically up or down to right height for a gamer. Thus, the gamer has a suitable location in front of the computer monitor 28, which can be rotated or tilted using the articulating monitor mount 26 to suit the gamer's preference. In play mode, the locking pin plungers 102 and 104 are depressed to secure the desk 18 to the articulating wall assembly 14. To ready for storage mode, the locking pin plungers 102 and 104 lift to remove the desk 18 from the articulating wall assembly 14. The desk mount 20 rotates down 90 degrees to fit inside the wall assembly 14.

Figure 7:
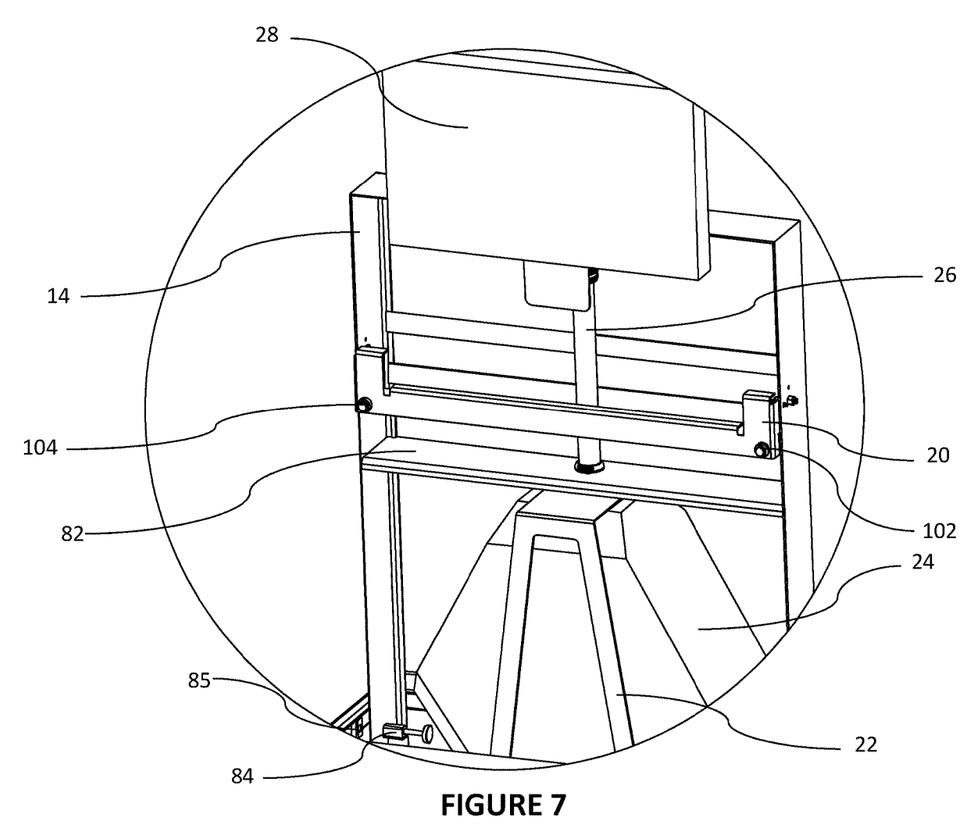
FIG. 7 illustrates an embodiment of the upper part of the articulating wall assembly with the desk removed and the desk mount rotated into the articulating wall assembly.

FIG. 7 illustrates an embodiment of the upper portion of the articulating wall assembly coupled to a computer 24 secured by computer mount 22 and a computer monitor 28 secured by monitor mount 26 on monitor shelf 82 is ready for storage mode. In the embodiment, the locking pin plungers 102 and 104 depress to lock the desk 18 (FIG. 6) to the desk mount 20 during play mode and are lifted to remove the desk 18 from the articulating wall assembly 14 to store the desk 18 in the box frame 38 as shown in FIGS. 2A-2B. The articulating desk mount 20 is rotated 90 degrees into the articulating wall assembly 14. The locking pin 84 attached to the articulating wall assembly 14 (shown in the lifted position above the locking latch 85) will be lifted so the articulating wall assembly 14 can be rotated into the box frame 38.

The articulating wall assembly 14 includes a computer monitor 28 supported by an articulating monitor mount 26 that extends from a monitor mount shelf 82, which is secured to the articulating wall assembly 14. A computer mount bracket 22 secures the computer 24 to the assembly 14. An articulating desk mount 20 supports a desk 18. In an embodiment, the desk 18 is secured at a desired height and the gamer will adjust to the seat by raising or lowering his or her chair. In an alternative embodiment, the articulating desk mount 20 can also slide and be secured to the monitor mount 26 to move the desk 18 vertically up or down to right height for a gamer. Thus, the gamer has a suitable location in front of the computer monitor 28, which can be rotated or tilted using the articulating monitor mount 26 to suit the gamer's preference. In play mode, the locking pin plungers 102 and 104 are depressed and secure the desk 18 to the articulating wall assembly 14. To ready for storage mode, the locking pin plungers 102 and 104 lift to remove the desk 18 from the articulating wall assembly 14.

Figure 8:
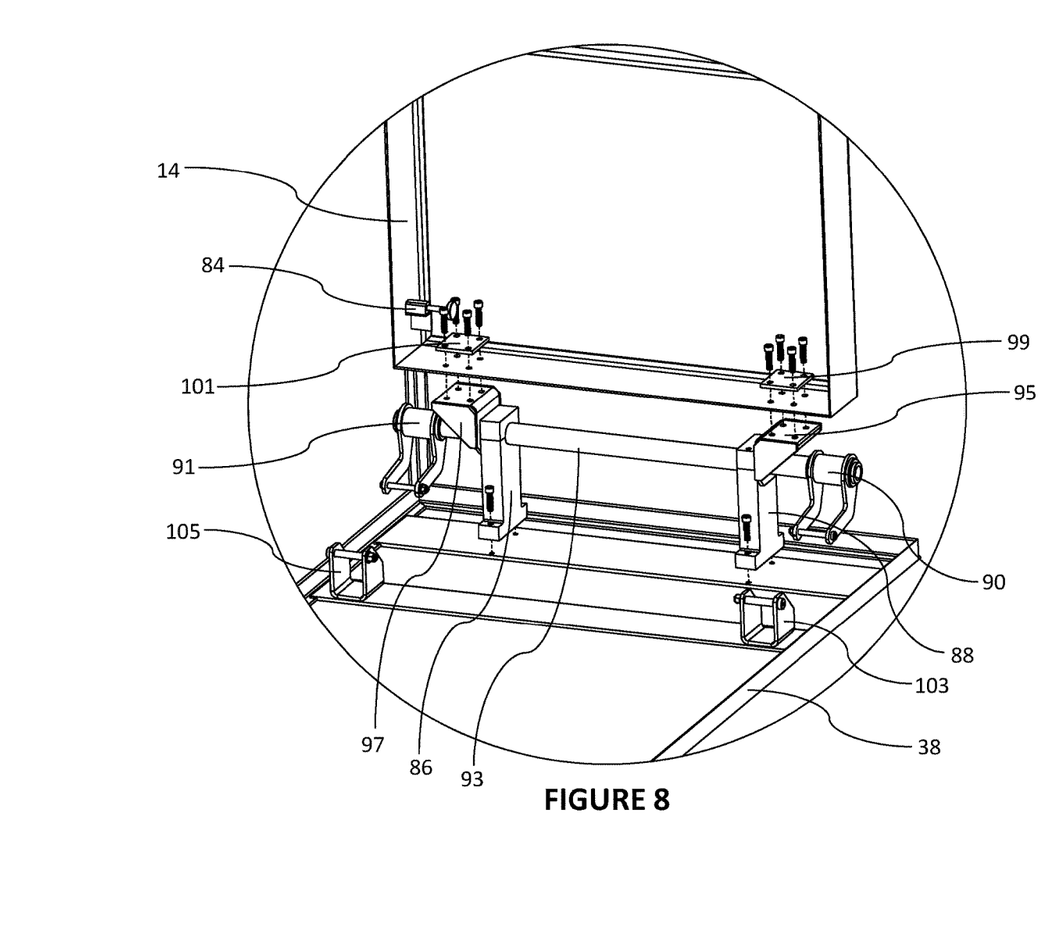
FIG. 8 illustrates an embodiment of the lower part of an articulating wall assembly and shows details of the rotating mechanism.

FIG. 8 is an exploded view of the articulating wall assembly and the rotating mechanism. This view shows the details of how the articulating wall assembly 14 is securely coupled to the rotating mechanism by two sets of screws through the mount plates 99 and 101, the bottom wall of the assembly 14 and the wall mount brackets 95 and 97. The wall mount brackets 95 and 97 are secured (e.g., welded) to the hinge arm 93, which is rotatably supported on the bearing surfaces of the rotating arm mounts 88 and 86, which are attached to the box frame 38. In an embodiment, the bottom of rotating arm mounts 86 and 88 are secured (e.g., welded or screwed) as shown to a horizontal member that is secured to the box frame 38. A set of clevis spring mounts 90 and 91 are secured (e.g., welded or screwed) to the ends of the hinge arm 93. A spring 37 (FIG. 5) will be connected to the clevis spring mount 90 and a box frame spring mount 103. A spring 39 (FIG. 5) will be connected to the clevis spring mount 91 and the box frame spring mount 105. Again the locking pin 84 is shown.

In the multiplayer game station, the game stations do not need to be arranged in a row, nor packed together, nor a certain number of game stations. However, it is desirable for the games stations arranged close to electrical power and oriented so the audience can readily see the audience.

Many of the parts of the systems can be purchased and/or implemented with high strength steel and a person of ordinary skill would understand the materials and parts to use after review of the specification. The choice of materials, manufacturing techniques, and conventional parts used are not essential to the invention. Thus, many structures of the game stations may be manufactured of rigid materials such as steel, SS, aluminum, hardwood, or any high strength material.

What is claimed:

1. A game station comprising:
   an articulating wall assembly;
   a base and floor assembly;
   a rotating mechanism secured to the articulating wall assembly and the base and floor assembly, wherein the articulating wall assembly includes a monitor mount and a computer retention element, wherein the base and floor assembly provides a floor for a gamer in front of the monitor mount during play mode and a housing for the articulating wall assembly during storage mode, and wherein the rotating mechanism is adapted to rotate the articulating wall assembly and the computer retention element and the monitor mount from a vertical position in play mode down into the base and floor assembly in storage mode; and
   a desk to support input devices to the computer, wherein the desk can be secured and removed from the articulating wall assembly, wherein the desk is secured vertically between the computer retention element and the monitor mount in play mode and inside of the base and floor assembly in storage mode.

2. The game station of claim 1, wherein the base and floor assembly secure, protect, and contain the articulating wall assembly and the computer retention element and the monitor mount in storage mode.

3. The game station of claim 1, further comprising an audience screen secured to the articulating wall assembly in a vertical plane that is adapted to display content to an audience in play mode.

4. The game station of claim 1, further comprising a computer retained by the computer retention element.

5. The game station of claim 1, further comprising a box frame that supports a front cover, an end cover, and a back cover that house the base and floor assembly and secure the rotating mechanism to the articulating wall assembly.

6. The game station of claim 1, further comprising a box frame inside of the base and floor assembly and secured to the rotating mechanism and the articulating wall assembly.

7. The game station of claim 1, further comprising a box frame secured to the base and floor assembly, wherein the rotating mechanism includes a rotatable hinge arm supported by rotating arm mounts secured to the box frame and further comprising a first locking pin secured to the box frame to stop rotation of the hinge arm in play mode.

8. The game station of claim 1, further comprising a box frame secured to the base and floor assembly, and a bumper and a second locking pin secured to the box frame, wherein the rotating mechanism includes a rotatable hinge arm supported by rotating arm mounts secured to the box frame and the bumper and the second locking pin stop rotation of the hinge arm in storage mode.

9. The game station of claim 1, further comprising a box frame that includes a set of box frame spring mounts, a rotatable hinge arm with a clevis spring mount at each end of the hinge arm, wherein the hinge arm is supported by a set of rotating arm mounts at each end that are secured to the box frame, and a spring coupled to each clevis spring mount and each box frame spring mount to provide a counterforce to gravity when the rotating mechanism transitions from play mode to storage mode.

10. The game station of claim 1, wherein the base and floor assembly provide a housing that encloses the articulating wall assembly during storage mode.

11. The game station of claim 1, further comprising articulating wall mount plates and wall mount brackets that secure a rotatable hinge arm to the articulating wall assembly.

12. A game station for a computer, comprising:
an articulating wall assembly;
a base and floor assembly;
a rotating mechanism secured to the articulating wall assembly and the base and floor assembly, wherein the articulating wall assembly includes a monitor mount and a computer retention element, wherein the base and floor assembly provides a floor for a gamer in front of the monitor mount during play mode and a housing for the articulating wall assembly during storage mode, and wherein the rotating mechanism is adapted to rotate the articulating wall assembly and the computer retention element and the monitor mount from a vertical position in play mode down into the base and floor assembly in storage mode; and
a box frame secured to the base and floor assembly, and a bumper and a second locking pin secured to the box frame, wherein the rotating mechanism includes a rotatable hinge arm supported by rotating arm mounts secured to the box frame and the bumper and the second locking pin stop rotation of the hinge arm in storage mode.

13. The game station of claim 12, wherein the base and floor assembly secure, protect, and contain the articulating wall assembly and the computer retention element and the monitor mount in storage mode.

14. The game station of claim 12, further comprising a desk to support input devices to the computer, wherein the desk can be secured and removed from the articulating wall assembly.

15. The game station of claim 12, further comprising an audience screen secured to the articulating wall assembly in a vertical plane that is adapted to display content to an audience in play mode.

16. The game station of claim 12, further comprising a computer within the articulating wall assembly in play mode and storage mode.

17. The game station of claim 12, further comprising a box frame that supports a front cover, an end cover, and a back cover that house the base and floor assembly and secure the rotating mechanism to the articulating wall assembly.

18. The game station of claim 12, further comprising a box frame inside of the base and floor assembly and secured to the rotating mechanism and the articulating wall assembly.

19. The game station of claim 12, further comprising a box frame secured to the base and floor assembly, wherein the rotating mechanism includes a rotatable hinge arm supported by rotating arm mounts secured to the box frame and further comprising a first locking pin secured to the box frame to stop rotation of the hinge arm in play mode.

20. The game station of claim 12, further comprising a box frame that includes a set of box frame spring mounts, a rotatable hinge arm with a clevis spring mount at each end of the hinge arm, wherein the hinge arm is supported by a set of rotating arm mounts at each end that are secured to the box frame, and a spring coupled to each clevis spring mount and each box frame spring mount to provide a counterforce to gravity when the rotating mechanism transitions from play mode to storage mode.

21. The game station of claim 12, wherein the base and floor assembly provide a housing that encloses the articulating wall assembly during storage mode.

22. The game station of claim 12, further comprising articulating wall mount plates and wall mount brackets that secure a rotatable hinge arm to the articulating wall assembly.

23. A game station for a computer, comprising:
an articulating wall assembly;
a base and floor assembly;
a rotating mechanism secured to the articulating wall assembly and the base and floor assembly, wherein the articulating wall assembly includes a monitor mount and a computer retention element, wherein the base and floor assembly provides a floor for a gamer in front of the monitor mount during play mode and a housing for the articulating wall assembly during storage mode, and wherein the rotating mechanism is adapted to rotate the articulating wall assembly and the computer retention element and the monitor mount from a vertical position in play mode down into the base and floor assembly in storage mode; and
a box frame that includes a set of box frame spring mounts, a rotatable hinge arm with a clevis spring mount at each end of the hinge arm, wherein the hinge arm is supported by a set of rotating arm mounts at each end that are secured to the box frame, and a spring coupled to each clevis spring mount and each box frame spring mount to provide a counterforce to gravity when the rotating mechanism transitions from play mode to storage mode.

24. The game station of claim 23, wherein the base and floor assembly secure, protect, and contain the articulating wall assembly and the computer retention element and the monitor mount in storage mode.

25. The game station of claim 23, further comprising a desk to support input devices to the computer, wherein the desk can be secured and removed from the articulating wall assembly.

26. The game station of claim 23, further comprising an audience screen secured to the articulating wall assembly in a vertical plane that is adapted to display content to an audience in play mode.

27. The game station of claim 23, further comprising a computer within the articulating wall assembly in play mode and storage mode.

28. The game station of claim 23, further comprising a box frame that supports a front cover, an end cover, and a back cover that house the base and floor assembly and secure the rotating mechanism to the articulating wall assembly.

29. The game station of claim 23, further comprising a box frame inside of the base and floor assembly and secured to the rotating mechanism and the articulating wall assembly.

30. The game station of claim 23, further comprising a box frame secured to the base and floor assembly, wherein the rotating mechanism includes a rotatable hinge arm supported by rotating arm mounts secured to the box frame and further comprising a first locking pin secured to the box frame to stop rotation of the hinge arm in play mode.

31. The game station of claim 23, wherein the base and floor assembly provide a housing that encloses the articulating wall assembly during storage mode.

32. The game station of claim 23, further comprising articulating wall mount plates and wall mount brackets that secure a rotatable hinge arm to the articulating wall assembly.

33. A game station for a computer, comprising:

an articulating wall assembly;

a base and floor assembly;

a rotating mechanism secured to the articulating wall assembly and the base and floor assembly, wherein the articulating wall assembly includes a monitor mount and a computer retention element, wherein the base and floor assembly provides a floor for a gamer in front of the monitor mount during play mode and a housing for the articulating wall assembly during storage mode, and wherein the rotating mechanism is adapted to rotate the articulating wall assembly and the computer retention element and the monitor mount from a vertical position in play mode down into the base and floor assembly in storage mode; and articulating wall mount plates and wall mount brackets that secure a rotatable hinge arm to the articulating wall assembly.

34. The game station of claim 33, wherein the base and floor assembly secure, protect, and contain the articulating wall assembly and the computer retention element and the monitor mount in storage mode.

35. The game station of claim 33, further comprising a desk to support input devices to the computer, wherein the desk can be secured and removed from the articulating wall assembly.

36. The game station of claim 33, further comprising an audience screen secured to the articulating wall assembly in a vertical plane that is adapted to display content to an audience in play mode.

37. The game station of claim 33, further comprising a computer within the articulating wall assembly in play mode and storage mode.

38. The game station of claim 33, further comprising a box frame that supports a front cover, an end cover, and a back cover that house the base and floor assembly and secure the rotating mechanism to the articulating wall assembly.

39. The game station of claim 33, further comprising a box frame inside of the base and floor assembly and secured to the rotating mechanism and the articulating wall assembly.

40. The game station of claim 33, further comprising a box frame secured to the base and floor assembly, wherein the rotating mechanism includes a rotatable hinge arm supported by rotating arm mounts secured to the box frame and further comprising a first locking pin secured to the box frame to stop rotation of the hinge arm in play mode.

41. The game station of claim 33, wherein the base and floor assembly provide a housing that encloses the articulating wall assembly during storage mode.

* * * * *